US009989079B2

(12) United States Patent
Juzak et al.

(10) Patent No.: US 9,989,079 B2
(45) Date of Patent: Jun. 5, 2018

(54) ATTACHMENT OF CHANNEL ELEMENTS

(71) Applicant: J. van Walraven Holding B.V., Mijdrecht (NL)

(72) Inventors: Marek Juzak, Mijdrecht (NL); Frank Nijdam, Zeewolde (NL)

(73) Assignee: J. van Walraven Holding B.V., Mijdrecht (NL)

( * ) Notice: Subject to any disclaimer, the term of this patent is extended or adjusted under 35 U.S.C. 154(b) by 0 days. days.

(21) Appl. No.: 14/892,228

(22) PCT Filed: Jul. 2, 2014

(86) PCT No.: PCT/NL2014/050432
§ 371 (c)(1),
(2) Date: Nov. 19, 2015

(87) PCT Pub. No.: WO2015/009140
PCT Pub. Date: Jan. 22, 2015

(65) Prior Publication Data
US 2016/0108944 A1    Apr. 21, 2016

(30) Foreign Application Priority Data

Jul. 18, 2013   (NL) ...................................... 2011193

(51) Int. Cl.
*E04B 2/74*        (2006.01)
*F16B 5/02*        (2006.01)
(Continued)

(52) U.S. Cl.
CPC ............ *F16B 7/0433* (2013.01); *F16B 39/28* (2013.01); *F16B 39/282* (2013.01); *E04B 2001/2415* (2013.01)

(58) Field of Classification Search
CPC ............................... F16B 37/04; F16B 37/045
See application file for complete search history.

(56) References Cited

U.S. PATENT DOCUMENTS 1,537,678 A * 5/1925 Jensen .................. E06B 3/9845
403/294
2,365,372 A * 12/1944 Allen ..................... B60N 2/015
16/2.1
(Continued)

FOREIGN PATENT DOCUMENTS

DE     2232737      1/1974
FR     2760800 A1   9/1998
(Continued)

OTHER PUBLICATIONS

A Chinese Office Action for a counterpart foreign application dated Jul. 5, 2016.

*Primary Examiner* — Ryan D Kwiecinski
*Assistant Examiner* — Kyle J. Walraed-Sullivan
(74) *Attorney, Agent, or Firm* — Hoffmann & Baron, LLP

(57) ABSTRACT

An attachment assembly includes an elongate channel element and a male fastening element including a shank to fasten the channel element to another structural element. The elongate channel element has a substantially flat bottom, sidewalls extending from the bottom substantially at right angles and an upper side opposite the bottom. The upper side of the channel element includes flanges which extend from the respective sidewalls towards each other and delimit between them a longitudinal slot extending over the length of the channel element. The bottom has an aperture formed in it for passing through the shank of the male fastening element. The male fastening element has a head that has a circular groove in the side where the shank is located. The groove in the head is engageable with a collar surrounding the aperture so as to mutually lock the head and the bottom in position at the aperture.

10 Claims, 5 Drawing Sheets

(51) Int. Cl.
  *F16B 7/04* (2006.01)
  *F16B 39/28* (2006.01)
  *F16B 39/282* (2006.01)
  *E04B 1/24* (2006.01)

(56) References Cited

U.S. PATENT DOCUMENTS

| | | | | |
|---|---|---|---|---|
| 2,684,170 A | * | 7/1954 | Schmitz | B65D 90/08 |
| | | | | 220/4.12 |
| 4,092,486 A | * | 5/1978 | Myers | H02G 3/0493 |
| | | | | 174/493 |
| 4,891,920 A | * | 1/1990 | Pingston | E04B 2/7409 |
| | | | | 181/287 |
| 5,285,602 A | * | 2/1994 | Felton | A47B 96/1416 |
| | | | | 52/127.2 |
| 5,370,488 A | * | 12/1994 | Sykes | F16B 21/02 |
| | | | | 411/551 |
| 6,120,403 A | * | 9/2000 | Suzuki | F16C 11/04 |
| | | | | 474/111 |
| 6,754,992 B1 | * | 6/2004 | Byfield | E04B 1/2403 |
| | | | | 403/205 |
| 6,929,227 B2 | * | 8/2005 | Hofmann | F16B 3/06 |
| | | | | 248/224.8 |
| 2005/0053446 A1 | * | 3/2005 | Huang | F16B 5/0208 |
| | | | | 411/396 |
| 2007/0113516 A1 | * | 5/2007 | Daudet | E04B 1/2403 |
| | | | | 52/714 |
| 2010/0126103 A1 | * | 5/2010 | diGirolamo | E04B 2/58 |
| | | | | 52/655.1 |
| 2012/0328825 A1 | * | 12/2012 | Kashimura | F16B 5/01 |
| | | | | 428/134 |

FOREIGN PATENT DOCUMENTS

| | | |
|---|---|---|
| GB | 1388959 | 4/1975 |
| GB | 1430686 | 3/1976 |

* cited by examiner

ATTACHMENT OF CHANNEL ELEMENTS

CROSS-REFERENCE TO RELATED APPLICATIONS

This application is the National Stage of International Application No. PCT/NL2014/050432 filed Jul. 2, 2014, which claims the benefit of Netherlands Application No. NL 2011193, filed Jul. 18, 2013, the contents of which is incorporated by reference herein.

FIELD OF THE INVENTION

The present invention relates to an attachment assembly comprising at least one elongate channel element and at least one male fastening element comprising a shank to fasten the channel element to another structural element,
the elongate channel element having a (substantially flat) bottom, sidewalls extending from the bottom substantially at right angles and an upper side opposite the bottom, wherein the upper side of the channel element comprises flanges which extend from the respective sidewalls towards each other and which delimit between them a longitudinal slot extending over the length of the channel element,
wherein the bottom has at least one aperture formed in it for passing through the shank of the male fastening element.

The invention has for an object to provide an improved attachment assembly.

SUMMARY OF THE INVENTION

This object is achieved by an attachment assembly as defined at the outset, wherein the bottom at its side facing the upper side of the channel element has an upstanding collar portion extending at least partially around said aperture, and wherein the male fastening element has a head that has a circular groove in the side where the shank is located, said collar portion being receivable in said groove in the head so as to mutually lock the head and the bottom in position at said aperture.

The invention provides a structure wherein the head of the male fastening element has a groove which is engageable with the collar portion surrounding the aperture in the bottom of the channel element. This provides a locking feature to retain the male fastening element at predetermined position on the bottom of the channel element.

In a possible embodiment the head of the male fastening element is a head integrally formed with the shank. Alternatively, the head is a nut which is screwed on the male fastening element.

In a possible embodiment of the invention the assembly comprises two channel elements of the type as defined in the above, which channel elements are positioned with their bottoms against each other, such that the at least one aperture of one channel element is aligned with the at least one aperture of the other channel element, wherein a male fastening element extends with its shank through the aligned apertures, and wherein the male fastening element with its head engages the bottom of one of the channel elements and wherein a nut cooperating with the shank engages the bottom of the other channel element, said nut having a circular groove in the side facing the bottom to receive the collar portion.

In a possible embodiment the collar portion is monolithically formed with the bottom of the channel element. Forming the collar portion monolithically with the bottom is no real additional burden in terms of manufacturing. No additional separate parts have to be manufactured and afterwards mounted to the bottom.

In a possible embodiment the aperture is a round hole. In this embodiment the collar portion may be formed as a circular ring shaped collar.

In another possible embodiment the aperture is an elongate hole with rounded end portions. In this embodiment a collar portion may be shaped as a half circular ring segment that is arranged at one or both of the end portions of the elongate hole.

In another possible embodiment the aperture in the bottom has a closed contour, said aperture having a first aperture portion with a diameter exceeding the diameter of the head of the male fastening element, such that the head can be inserted through said first aperture portion, and a second aperture portion adjoining the first aperture portion, which second aperture portion has a smaller diameter which exceeds the diameter of the shank, but is smaller than the diameter of the head of the male fastening element. In this embodiment the collar portion is arranged at the second aperture portion.

The invention will be elucidated in the following detailed description with reference to the drawings.

BRIEF DESCRIPTION OF THE DRAWINGS

FIG. 6 shows an elevational view from above of a bottom of yet another embodiment of a channel element for an attachment assembly according to the invention.

DETAILED DESCRIPTION OF THE INVENTION

Figure 1:
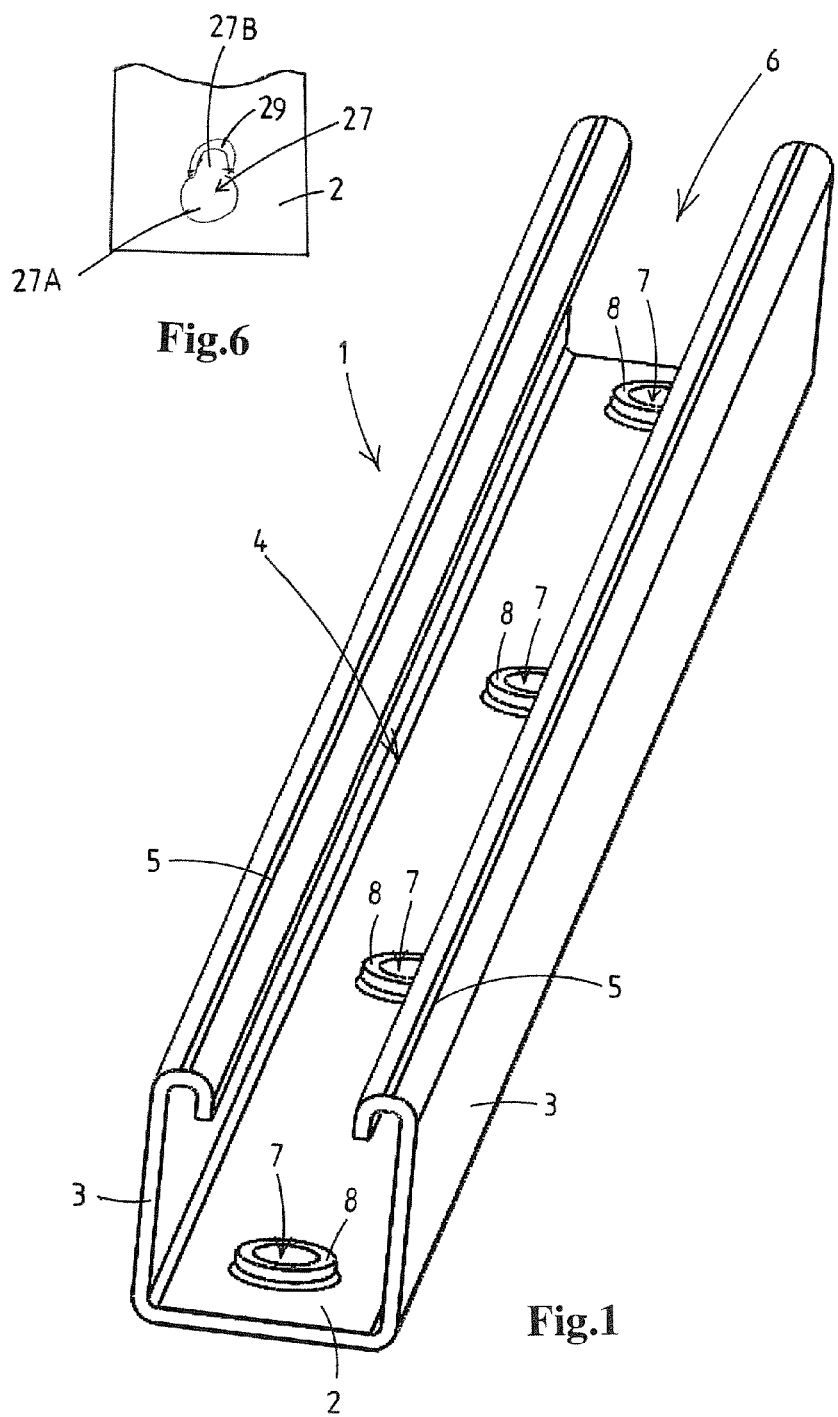
FIG. 1 shows in a view in perspective an embodiment of a channel element for an attachment assembly according to the invention.

FIG. 1 shows a channel element 1. The channel element 1 is of the type in the art often referred to as a "strut rail". The channel element is made of metal, preferably steel, preferably with a wall thickness of around 2 mm. However, the shown channel element is an example. Also other channel elements are possible made of other materials such as other metal, composites or plastics. Also the wall thickness of the channel element may be different.

The channel element 1 has a substantially flat bottom 2, sidewalls 3 extending from the bottom substantially at right angles and an upper side 4 opposite the bottom 2. The upper side 4 of the channel element 1 comprises flanges 5 which extend from the respective sidewalls 3 towards each other and which delimit between them a longitudinal slot 6 extending over the length of the channel element 1.

The bottom 2 has apertures 7 formed in it. The apertures 7 are round holes. The bottom 2 at its inner side, which is the side facing the upper side 4 of the channel element 1, has an upstanding collar portion 8 surrounding said apertures 7.

In the shown example the apertures 7 are equally distributed over the length of the bottom 2. It is however conceivable that the apertures are distributed otherwise.

Figure 2:
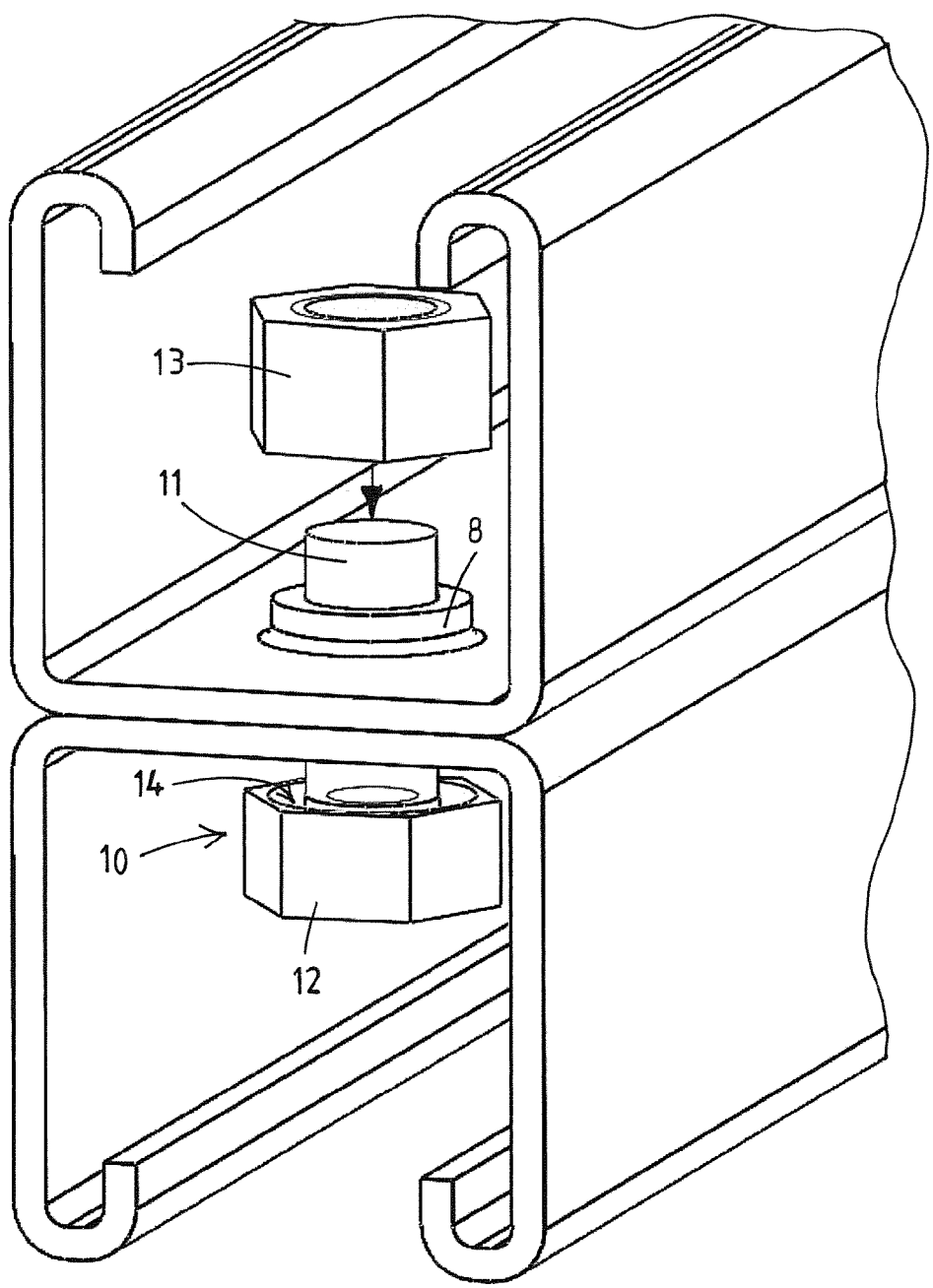
FIG. 2 illustrates in a view in perspective two channel elements of FIG. 1 placed back to back during the attachment.
Figure 3:
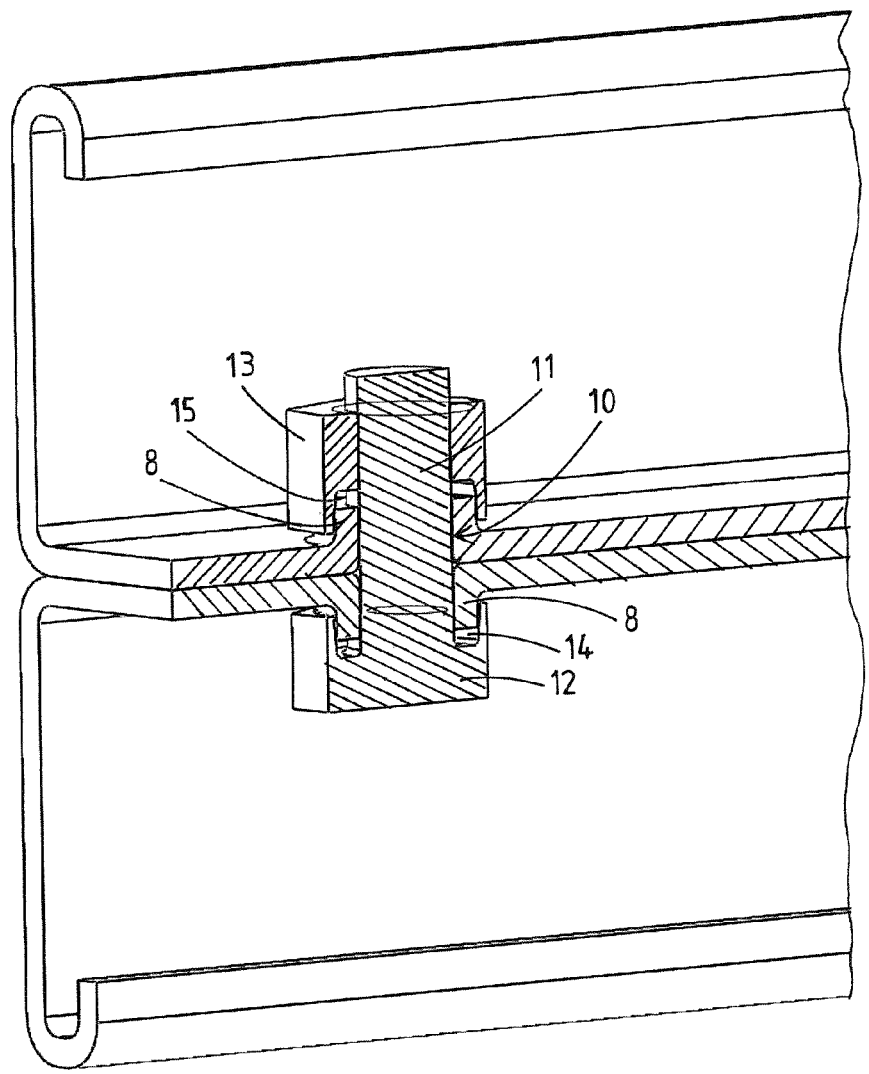
FIG. 3 shows in a sectional view the channel elements of FIG. 2 in an attached state.

In FIGS. 2 and 3 is shown how two channel elements as shown in FIG. 1 are placed with their bottoms 2 against each other. Apertures 7 of either one of the respective bottoms 2 are aligned with each other such that a male fastening element 10, in the example a bolt with a shank 11 and a head 12, can pass with its shank 11 through the apertures 7.

The shank 11 of the bolt is provided with a male thread. A nut 13 can be arranged on the shank 11. The nut 13 is provided with an inner thread that can cooperate with the male thread on the shank 11 of the bolt.

The head 12 of the bolt has a circular groove 14 formed in an underside, which is the side from which the shank 11 extends. When the head 12 is moved towards the inner side of the bottom 2 of the channel element 1, the upstanding collar portion 8 will be received in the groove 14 of the head 12, which is clearly visible in FIG. 3.

In the nut 13 on one side is formed a similar groove 15 as in the head 12 of the bolt. When the nut 13 is screwed onto the bolt, the collar portion 8 of the other channel element 2 will be received in the groove 15 as is best visible in FIG. 3.

Figure 4:
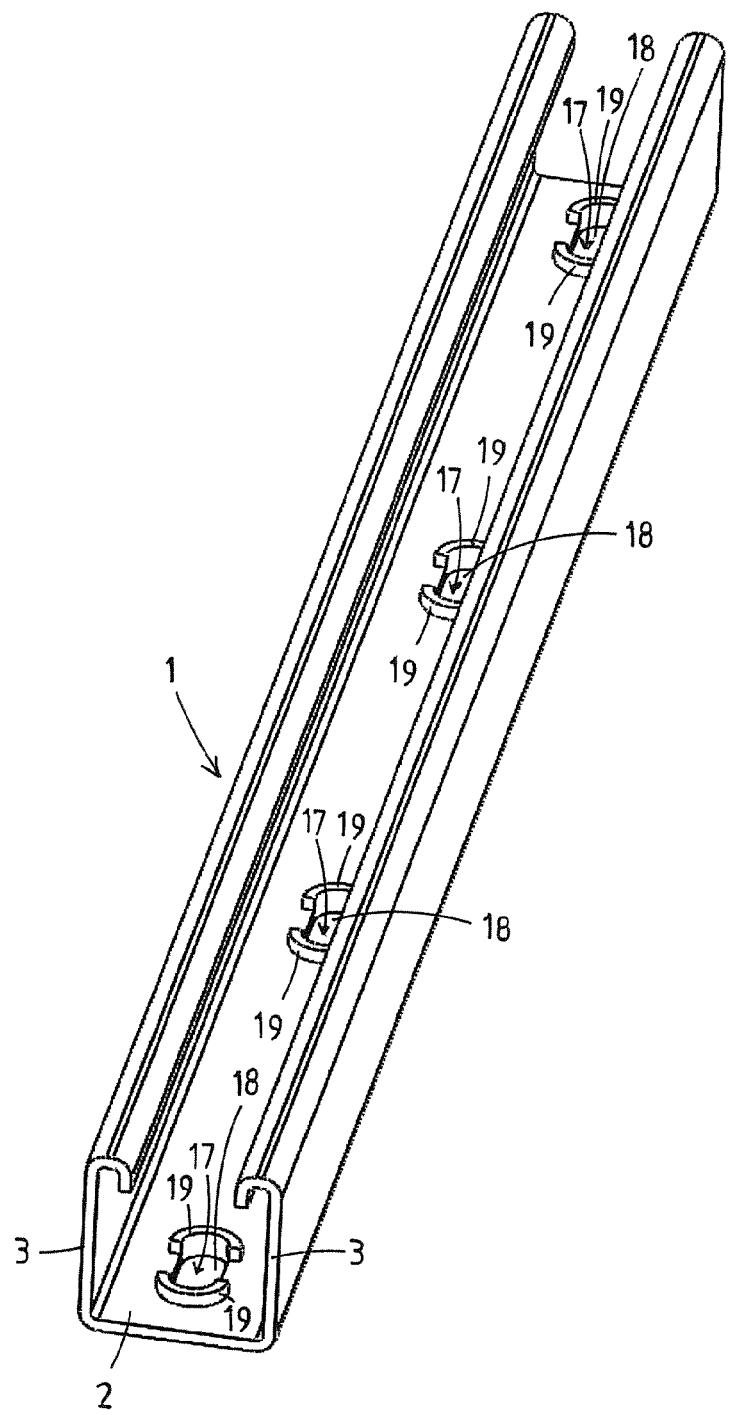
FIG. 4 shows in a view in perspective another embodiment of a channel element for an attachment assembly according to the invention.
Figure 5:
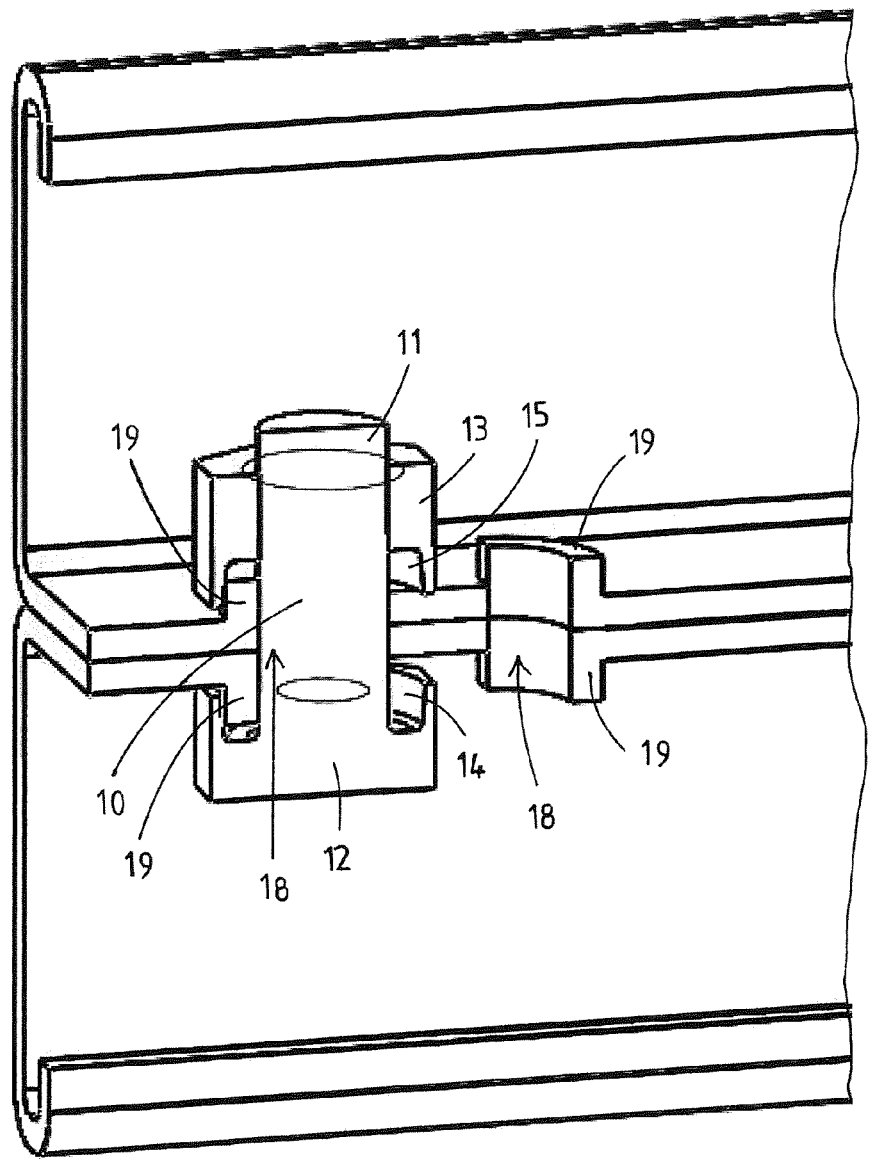
FIG. 5 illustrates in a sectional view in perspective two channel elements of FIG. 4 placed back to back during the attachment.

FIGS. 4 and 5 show another possible embodiment of a channel element. In the FIGS. 4 and 5 similar features are indicated with the same reference numerals as in the above described FIGS. 1-3. The channel element 1 is provided in the bottom 2 with elongated holes 17. The elongate holes 17 have rounded end portions 18. At each of the end portions 18 a half circular collar portion 19 is provided.

During mounting the head 12 with the groove 14 is located above the collar portion 19. When the head 12 is moved towards the bottom 2, as is shown in FIG. 5, the collar portion 19 will be received in the groove 14 in the head 12 of the bolt 10. Thereby the head 12 of the bolt 10 is locked with respect to the bottom 2 in a longitudinal direction of the channel element 1. When the nut 13 is screwed on the bolt 10, and screwed towards the bottom 2 of the other channel element 1, the collar portion 19 will be received in the groove 15 in the nut 13. Thus, the head 12 and the nut 13 are locked with respect to the respective bottoms 2 of the channel elements 1 arranged back to back. By this locking arrangement between the collar portions 19 and the head 12 and the nut respectively, a movement of the shank 11 within the elongate aperture 17 is inhibited. Thereby a firm and secure connection between the two channel elements 1 is provided.

It should be noted that also a channel element with a combination of round holes (cf. FIG. 1) and elongate holes (cf. FIG. 5) is conceivable.

In another embodiment of a channel element is illustrated In FIG. 6. The aperture 27 in the bottom has a closed contour. The aperture 27 has a first aperture portion 27A with a diameter exceeding the diameter of the head of the male fastening element, such that the head can be inserted through said first aperture portion 27A. The aperture 27 furthermore has a second aperture portion 27B adjoining the first aperture portion 27A. The second aperture portion 27B has a smaller diameter which exceeds the diameter of the shank, but is smaller than the diameter of the head of the male fastening element. In this embodiment the collar portion 29 is arranged at the second aperture portion 27B.

In the embodiments shown in the figures, the collar portion is formed as a full circular (FIG. 1) or a half circular (FIG. 4, FIG. 6) upstanding edge portion, which is monolithically formed with the bottom 2. It is however also conceivable to provide upstanding protrusions of another shape. For example a plurality of upstanding lugs arranged in a circular configuration would be possible. It is to be understood that such equivalent protrusions are deemed to fall within the term "collar portion" as used herein.

Furthermore, the collar portion may be attached to the bottom of the channel element by some means, for example an adhesive, or welding, but it is preferred that the collar portion 8, 19 is formed integrally (in one piece) with the bottom.

It is noted that also the side walls of the channel element may be provided with openings at which collar portions 8, 19 as described in the above and as illustrated in the FIGS. 1-5 are provided.

In the example shown in the figures two channel elements 1 extend in a parallel fashion with each other. It is of course also possible to connect channel elements 1 in a similar way, but with another angular orientation relative to each other.

Furthermore it is noted that according to the invention a channel element of the assembly according to the invention can also be mounted to another structural element by means of a male fastening element such as a bolt or a screw having a head as described in the above. For example the bottom 2 of the channel element 1 can be arranged against a wall surface and the channel element 1 can be fixed to said wall surface by means of one or more screws having a head with a groove as described.

It is noted that throughout the above description it is mentioned that the groove in the head of the male fastening element is circular. Strictly this circular shape is not necessary for a functioning design in which the head is locked at the flange by a collar portion, as long as the collar portion can be received in the groove. However, from a practical point of view the circular shape of the groove is preferred, since it makes the head rotationally symmetric, which is advantageous in handling.

The invention claimed is:

1. An attachment assembly comprising two elongate channel elements and at least one male fastening element comprising a shank to fasten the two elongate channel elements to one another, the two elongate channel elements each having a bottom, sidewalls extending from the bottom substantially at right angles and an upper side opposite the bottom, wherein the upper side of the two elongate channel elements comprises flanges which extend from respective sidewalls towards each other and which delimit between them a longitudinal slot extending over the length of the two elongate channel elements, wherein:

each of the channel elements has a plurality of apertures formed in the bottom for passing through the shank of the at least one male fastening element, the bottom of each of the two elongate channel elements, at an inner side thereof has an upstanding collar portion extending at least partially around at an aperture of the plurality apertures and being monolithically formed with the bottom of the two elongate channel elements, a head of the at least one male fastening element has a circular groove in a side facing a corresponding inner side of the bottom and a nut has a circular groove in a side facing a corresponding inner side of the bottom, the two elongate channel elements are positioned with bottoms thereof back to back against each other, wherein at least one aperture of one of the two elongate channel elements is aligned with at least one aperture of another elongate channel element of the two elongate channel elements, and wherein the shank of the at least one male fastening element extends through the aligned apertures, wherein the head of the at least one male fastening element during mounting is moved towards the inner side of the bottom of one of the two elongate channel elements and receives the upstanding collar portion in the circular groove in the head, and wherein a nut cooperating with the shank during mounting is moved towards the inner side of the bottom of the other of the two elongate channel elements, and receives the upstanding collar portion in the circular groove in the nut so as to mutually lock the head and a corresponding bottom and the nut and a corresponding bottom in position at the at least one aperture.

2. The attachment assembly according to claim 1, wherein the head of the at least one male fastening element is a head integrally formed with the shank.

3. The attachment assembly according to claim 1, wherein the head is a nut.

4. The attachment assembly according to claim 1, wherein the at least one aperture is a round hole.

5. The attachment assembly according to claim 1, wherein the at least one aperture is an elongate hole with rounded end portions.

6. The attachment assembly according to claim 4, wherein the upstanding collar portion is a circular ring shaped collar.

7. The attachment assembly according to claim 5, wherein, adjacent at least one of the end portions of the elongate hole, the upstanding collar portion is arranged.

8. The attachment assembly according to claim 1, wherein the at least one aperture in the bottom has a closed contour, the at least one aperture having a first aperture portion with a diameter exceeding the diameter of the head of the at least one male fastening element, such that the head can be inserted through the first aperture portion, and a second aperture portion adjoining the first aperture portion, which second aperture portion has a smaller diameter which exceeds the diameter of the shank, but is smaller than the diameter of the head of the at least one male fastening element, and wherein the upstanding collar portion is arranged at the second aperture portion.

9. The attachment assembly according to claim 7, wherein the upstanding collar portion is shaped as a half circular ring segment.

10. An attachment assembly comprising two strut rails and at least one male fastening element comprising a shank to fasten the two strut rails to one another, the two strut rails each having a bottom, sidewalls extending from the bottom substantially at right angles and an upper side opposite the bottom, wherein the upper side of each of the two strut rails comprises flanges which extend from the respective sidewalls towards each other and which delimit a longitudinal slot extending over the length of the two strut rails, wherein:

each of the two strut rails has a plurality of apertures formed in the bottom for passing through the shank of the at least one male fastening element, and the bottom of each of the strut rails, at an inner side thereof has an upstanding collar portion extending at least partially around at least one of the apertures and being monolithically formed with the bottom of the strut rail, a head of the at least one male fastening element has a circular groove in a side facing a corresponding inner side of the bottom and a nut has a circular groove in a side facing a corresponding inner side of the bottom, the strut rails are positioned with the bottoms thereof back to back against each other, wherein at least one aperture of one of the strut rails is aligned with at least one aperture of the other one of the strut rails, and wherein the shank of the at least one male fastening element extends through the aligned apertures, wherein the head of the at least one male fastening element during mounting is moved towards the inner side of the bottom of one of the strut rails and receives the upstanding collar portion in the circular groove in the head, and wherein a nut cooperating with the shank during mounting is moved towards the inner side of the bottom of another one of the strut rails and receives the upstanding collar portion in the circular groove in the nut so as to mutually lock the head and a corresponding bottom and the nut and a corresponding bottom in position at the at least one aperture.

* * * * *